US012333570B2

(12) United States Patent
Isobe

(10) Patent No.: US 12,333,570 B2
(45) Date of Patent: Jun. 17, 2025

(54) INFORMATION PROCESSING APPARATUS, NON-TRANSITORY COMPUTER READABLE MEDIUM STORING INFORMATION PROCESSING PROGRAM, AND METHOD

(71) Applicant: FUJIFILM Business Innovation Corp., Tokyo (JP)

(72) Inventor: Kimihiko Isobe, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 51 days.

(21) Appl. No.: 17/386,576

(22) Filed: Jul. 28, 2021

(65) Prior Publication Data

US 2022/0301014 A1 Sep. 22, 2022

(30) Foreign Application Priority Data

Mar. 22, 2021 (JP) ................................. 2021-047641

(51) Int. Cl.
*G06Q 30/0273* (2023.01)
*G06Q 10/087* (2023.01)
*G06Q 30/0241* (2023.01)
*G06Q 30/0251* (2023.01)

(52) U.S. Cl.
CPC ....... *G06Q 30/0273* (2013.01); *G06Q 10/087* (2013.01); *G06Q 30/0253* (2013.01); *G06Q 30/0277* (2013.01)

(58) Field of Classification Search
CPC . G06Q 30/0207–0277; G06Q 30/0273; G06Q 10/087; G06Q 30/0253; G06Q 30/0254; G06Q 30/0269

USPC .......... 705/14.71, 26.5, 14.72, 14.64, 14.69; 707/17.014
See application file for complete search history.

(56) References Cited

U.S. PATENT DOCUMENTS 10,185,115 B2    1/2019    Wang et al.
10,962,735 B2    3/2021    Wang et al.
(Continued)

FOREIGN PATENT DOCUMENTS

JP    2007219879    8/2007
JP    2017054097    3/2017
(Continued)

OTHER PUBLICATIONS

NPL Amazon ad, Programmatic advertising, 2021 (Year: 2021).*
(Continued)

*Primary Examiner* — Tarek Elchanti
(74) *Attorney, Agent, or Firm* — JCIPRNET

(57) ABSTRACT

An information processing apparatus includes a processor configured to from each of a plural order-receiving companies that make-to-order a product ordered by an orderer, receive at least one index value related to a production efficiency of the product and control advertisement distribution to an ordering terminal used by the orderer of the product for an order of the product, so that an advertisement of an order-receiving company having a larger distribution score, that is obtained from the index value for each order-receiving company and indicates a larger value as the production efficiency of the product increases, has a higher degree of contact that the orderer of the product contacts the advertisement.

13 Claims, 10 Drawing Sheets

(56) References Cited

U.S. PATENT DOCUMENTS

| | | | |
|---|---|---|---|
| 2003/0130890 A1* | 7/2003 | Banerjee | G06Q 30/0207 705/14.25 |
| 2006/0029107 A1* | 2/2006 | McCullough | H04M 15/8083 370/527 |
| 2008/0027820 A1* | 1/2008 | Brill | G06Q 30/0621 705/26.5 |
| 2009/0313318 A1* | 12/2009 | Dye | G06Q 30/00 709/202 |
| 2011/0040616 A1* | 2/2011 | Kannan | G06Q 30/0246 707/E17.014 |
| 2011/0191154 A1* | 8/2011 | Johnson | G06Q 30/0241 705/14.4 |
| 2012/0156346 A1* | 6/2012 | Grigoryan | A21D 8/06 426/496 |
| 2012/0284118 A1* | 11/2012 | Mamich, Jr. | G06Q 30/0261 705/14.52 |
| 2012/0303411 A1* | 11/2012 | Chen | G06Q 10/087 705/7.31 |
| 2014/0279025 A1* | 9/2014 | Klanjsek | G06Q 30/0276 705/14.64 |
| 2014/0279168 A1* | 9/2014 | Malaczynski | G06Q 30/0611 705/26.4 |
| 2015/0100435 A1* | 4/2015 | Sanio | G06Q 30/0275 705/14.71 |
| 2015/0254732 A1* | 9/2015 | Snyder | G06Q 30/0276 705/14.72 |
| 2017/0243275 A1* | 8/2017 | Goens | G06Q 30/0625 |
| 2020/0172840 A1* | 6/2020 | Chelle | C12M 1/14 |

FOREIGN PATENT DOCUMENTS

| | | |
|---|---|---|
| JP | 2018156514 | 10/2018 |
| JP | 2018169018 | 11/2018 |
| JP | 2020042508 | 3/2020 |
| WO | 0030008 | 5/2000 |

OTHER PUBLICATIONS

"Office Action of Europe Counterpart Application", issued on Mar. 14, 2024, p. 1-p. 6.

"Search Report of Europe Counterpart Application", issued on Feb. 11, 2022, p. 1-p. 7.

"Notice of Reasons for Refusal of Japan Counterpart Application", issued on Dec. 10, 2024, with English translation thereof, p. 1-p. 5.

"Decision of Refusal of Japan Counterpart Application", issued on Mar. 25, 2025, with English translation thereof, p. 1-p. 3.

* cited by examiner

FIG. 3

| PRODUCTION MANAGEMENT INDEX | CONTENT |
|---|---|
| HOURLY OPERATION RATE | OPERATING TIME / LOAD TIME |
| PERFORMANCE OPERATION RATE | NET OPERATING TIME / OPERATING TIME |
| A EFFICIENCY | NUMBER OF PRODUCTS / NET OPERATING TIME |
| C EFFICIENCY | NUMBER OF PRODUCTS / LOAD TIME |
| LOAD FACTOR | JOB TIME PER EQUIPMENT / SHIFT TIME |
| IMPROVEMENT RATE | IMPROVEMENT RATE OF EACH INDEX IN SPECIFIC PERIOD |
| DELIVERY TIME ACHIEVEMENT RATE | NUMBER OF ORDERS FOR PRODUCTS DELIVERED BY DELIVERY TIME / NUMBER OF ORDERS |
| NUMBER OF NON-DEFECTIVE PRODUCTS | NUMBER OF NON-DEFECTIVE PRODUCTS / (NUMBER OF NON-DEFECTIVE PRODUCTS + NUMBER OF DEFECTIVE PRODUCTS) |
| OVERALL EQUIPMENT EFFECTIVENESS | HOURLY OPERATION RATE × PERFORMANCE OPERATION RATE × NUMBER OF NON-DEFECTIVE PRODUCTS |

FIG. 9

| DISTRIBUTION SCORE | ADJUSTMENT RATE [%] |
|---|---|
| 0 TO 10 | 20 |
| 10 TO 30 | 10 |
| 30 TO 60 | 0 |
| 60 TO 80 | −5 |
| 80 TO 90 | −10 |
| ⋮ | ⋮ |

FIG. 10

| ADJUSTMENT RATE [%] | ADJUSTMENT SCORE |
|---|---|
| 0 TO 20 | 10 |
| 20 TO 40 | 5 |
| 40 TO 60 | 0 |
| 60 TO 80 | −5 |
| 80 TO 100 | −10 |

INFORMATION PROCESSING APPARATUS, NON-TRANSITORY COMPUTER READABLE MEDIUM STORING INFORMATION PROCESSING PROGRAM, AND METHOD

CROSS-REFERENCE TO RELATED APPLICATIONS

This application is based on and claims priority under 35 USC 119 from Japanese Patent Application No. 2021-047641 filed Mar. 22, 2021.

BACKGROUND

(i) Technical Field

The present invention relates to an information processing apparatus, an information processing apparatus, a non-transitory computer readable medium storing an information processing program, and method.

(ii) Related Art

In JP2018-156514A, an advertisement management server including an advertisement management unit that manages audio-only advertisements, a rank setting unit that sets a rank of a store to which the advertisement is distributed, a point management unit that manages points owned by the store and points for each rank set in the store, and a distribution management unit that manages so that an advertisement of a first store is distributed to a second store and an advertisement of the second store is distributed to the first store on a designated schedule by exchanging the points required for distributing the advertisement between the first store and the second store is disclosed.

In JP2020-42508A, an advertisement management server including an advertisement management unit that manages an advertisement that includes at least video out of audio or video, a rank setting unit that sets a rank of a client to which the advertisement is distributed, a point management unit that manages points owned by the client to which the advertisement is distributed and points for each rank set for the client, and a distribution management unit that manages, by exchanging the points required for distributing the advertisement between a first client and a second client included in the client, so that an advertisement of the first client is distributed to the second client and an advertisement of the second client is distributed to the first client on a designated schedule is disclosed.

SUMMARY

For advertisements distributed by the Internet and the like, a distribution time zone and a distribution amount are determined according to the advertising cost paid by a company that is a distribution source of the advertisement, and an advertisement of a company that pays more for advertising than other companies is distributed in preference to advertisements of other companies.

However, a company for which an advertisement is distributed more than other companies does not always produce cheap and high-quality products efficiently through corporate efforts, and it is unclear whether the company has a higher degree of social contribution than other companies and has a good working environment for employees.

Aspects of non-limiting embodiments of the present disclosure relate to an information processing apparatus and a non-transitory computer readable medium storing an information processing program that capable of preferentially distributing an advertisement of a company that produces a product that meets user requirements more efficiently than other companies.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to from each of a plurality of order-receiving companies that make-to-order a product ordered by an orderer, receive at least one index value related to a production efficiency of the product and control advertisement distribution to an ordering terminal used by the orderer of the product for an order of the product, so that an advertisement of an order-receiving company having a larger distribution score, that is obtained from the index value for each order-receiving company and indicates a larger value as the production efficiency of the product increases, has a higher degree of contact that the orderer of the product contacts the advertisement.

BRIEF DESCRIPTION OF THE DRAWINGS

Exemplary embodiment(s) of the present invention will be described in detail based on the following figures, wherein:

FIG. 3 is a diagram showing examples of a production management index;

FIG. 9 is a diagram showing an example of a cost adjustment table;

FIG. 10 is a diagram showing an example of a score adjustment table; and

DETAILED DESCRIPTION

Figure 1:
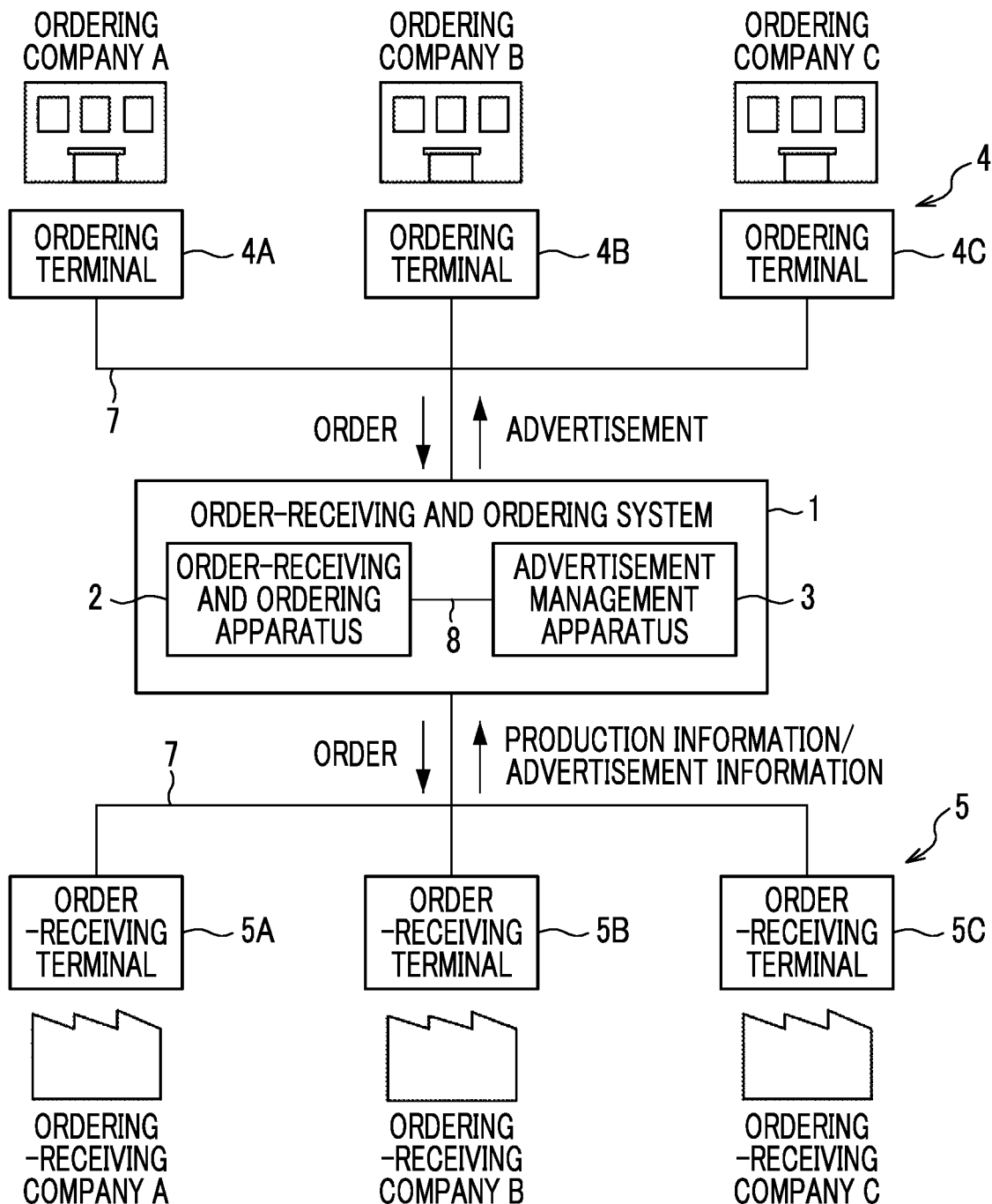
FIG. 1 is a diagram showing an example of a configuration of an order-receiving and ordering system.

Hereinafter, the present exemplary embodiment will be described with reference to the drawings. Note that the same components and the same processing are given the same reference numerals throughout the drawings, and duplicate description will be omitted.

FIG. 1 is a diagram showing a configuration example of a product order-receiving and ordering system 1 according to the present exemplary embodiment. There is no restriction on the type of the product handled by the order-receiving and ordering system 1 as long as the product is a product of which production is started after receiving an order, that is, a product made to order. In addition to tangible items, the products here also include intangible items such as design data.

In the following, as an example, an order-receiving and ordering system 1 that mediates between an ordering company and an order-receiving company so that an order for printed matter such as a book and a pamphlet is received from the ordering company, and the printed matter is produced by the order-receiving company designated by the ordering company from among a plurality of order-receiving companies registered in advance will be described.

As shown in FIG. 1, an ordering terminal 4 installed in each ordering company and an order-receiving terminal 5 installed in each order-receiving company are connected to the order-receiving and ordering system 1 by a communication line 7. In the example of FIG. 1, although three ordering terminals 4 (referred to as "ordering terminal 4A", "ordering terminal 4B", and "ordering terminal 4C", respectively) installed in an ordering company A, an ordering company B, and an ordering company C and three order-receiving terminals 5 (referred to as "order-receiving terminal 5A", "order-receiving terminal 5B", and "order-receiving terminal 5C", respectively) installed in an order-receiving company A, an order-receiving company B, and an order-receiving company C are connected to the order-receiving and ordering system 1, there is no restriction on the number of ordering terminals 4 and order-receiving terminals 5 connected to the order-receiving and ordering system 1. Further, there is no restriction on the type of the communication line 7, and the type of the communication line 7 may be wired or wireless, and may be a dedicated line or a public line.

The order-receiving and ordering system 1 acquires product production information and advertisement information from each order-receiving company via the order-receiving terminal 5, selects an advertisement appropriate for the ordering company from among a plurality of advertisements registered in advance by using the acquired production information, and distributes the selected advertisement to the ordering company.

A person in charge of ordering a product of an ordering company, for example, places an order for a product by designating a product specification and an ordering destination of the product, that is, the order-receiving company using the ordering terminal 4, but an advertisement distributed from the order-receiving and ordering system 1 is displayed together with a product ordering screen 21 in the ordering terminal 4 (refer to, FIG. 4 which will be described later). Therefore, since the person in charge of ordering a product will be aware of the order-receiving company displayed in the advertisement, the order-receiving company for which an advertisement is distributed is more likely to receive the order for the product than an order-receiving company for which no advertisement is distributed. Note that the person in charge of ordering is an example of an orderer who places an order for a product.

In a case where the order-receiving and ordering system 1 receives an order for a product from the ordering terminal 4, the order-receiving and ordering system 1 places an order for the product with the order-receiving company designated in the order.

The order-receiving and ordering system 1 that performs such processing includes an order-receiving and ordering apparatus 2 and an advertisement management apparatus 3 connected by an internal local area network (LAN) 8.

The order-receiving and ordering apparatus 2 has a mediation function of receiving an order for a product from each ordering company via the ordering terminal 4 and placing an order for the product with the order-receiving company designated in the order, and a management function of receiving production information from each order-receiving company via the order-receiving terminal 5 and managing the received production information for each order-receiving company.

The product production information is information representing a production system, production efficiency, and production status of the product of the order-receiving company, in other words, information representing a production capacity of the product of the order-receiving company.

Figure 2:
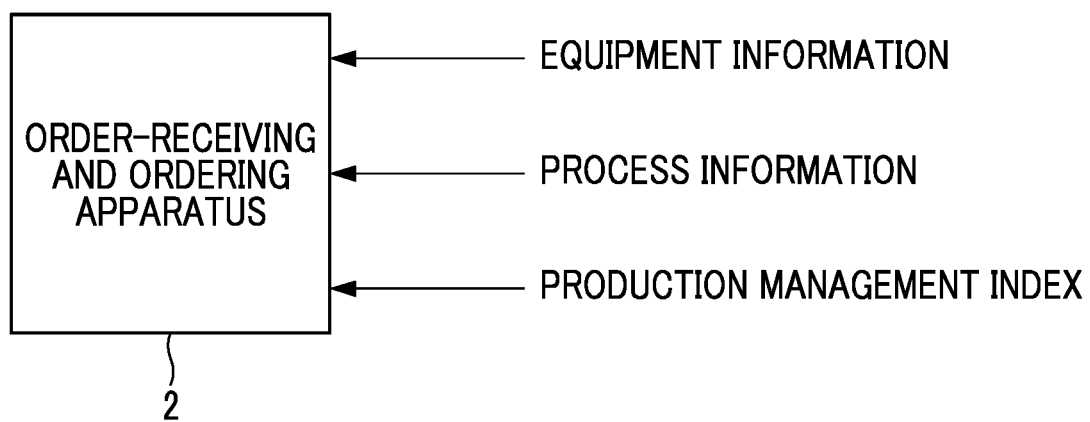
FIG. 2 is a diagram showing examples of production information.

FIG. 2 is a diagram showing an example of production information. As shown in FIG. 2, the order-receiving and ordering apparatus 2 receives equipment information, process information, and a production management index as the production information from each order-receiving company.

The equipment information is information related to the equipment itself that produces the product, such as the type, model number, the number of equipment, set advertising tags, and compatible processing and manufacturing methods that the order-receiving company owns to produce the product. Note that the advertising tags set in the equipment will be explained in detail later.

The process information is information related to the production status of the product in the order-receiving company, such as a production schedule of the product, progress information related to the production of the product, and traceability information representing which process is being executed for each product.

The production management index is at least one index value related to the production efficiency of the product of the order-receiving company.

FIG. 3 is a diagram showing an example of the production management index. The production management index includes, for example, each item of hourly operation rate, performance operation rate, A efficiency, C efficiency, load factor, improvement rate, delivery time achievement rate, the number of non-defective products, and overall equipment effectiveness, and each item is a production management index.

The hourly operation rate is a ratio of operating time to load time of the equipment, and is an example of the production management index notified for each equipment of the order-receiving company. The load time of the equipment is energization time of the equipment, and the hourly operation rate represents a ratio of time during which the equipment has been operating including an operation confirmation of the equipment, that is, the time during which the equipment has been operating, to the load time for a specific period (for example, one day).

The performance operation rate is a ratio of net operating time to the operating time of the equipment, and is an example of the production management index notified for each equipment of the order-receiving company. The net operating time is the time during which the product has been actually produced in the operating time, and is the time obtained by excluding the time during which the ordered product is not produced, such as time for preliminary confirmation of confirming whether the equipment operates normally from the operating time.

The A efficiency is a ratio of the number of products produced to the net operating time of the equipment, and is an example of the production management index notified for each equipment of the order-receiving company.

The C efficiency is a ratio of the number of products produced to the load time of the equipment, and is an example of the production management index notified for each equipment of the order-receiving company.

The load factor is a ratio of the job time per equipment to shift time of a person in charge of producing the product, and is an example of a production management index notified by an average value of all the persons in charge for each equipment of the order-receiving company. The shift time of the person in charge is the working time at a factory specified in advance for each person in charge, for example, from 8:30 to 17:00, and the job time is the time when the person in charge operates the equipment and is directly involved in the production and processing of the product.

The improvement rate is a ratio representing how much each ratio or value representing the production management index such as the hourly operation rate or the A efficiency has been improved in a specific period, and is an example of a production management index notified for each ratio or value representing the production management index.

The delivery time achievement rate is a ratio of the number of orders for the products received from the ordering company to the number of orders for the products delivered by the delivery time contracted with the ordering company, that is, the number of orders for which the delivery time has been achieved, and is an example of a production management index notified for each product type or as a ratio of the entire order-receiving company.

The non-defective product rate is the ratio of the number of non-defective products to the products produced regardless of the classification of non-defective products and defective products, and is an example of a production management index notified for each product type or as a ratio of the entire order-receiving company.

The overall equipment effectiveness is a ratio represented by the product of the hourly operation rate and performance operation rate for all equipment owned by the order-receiving company and the non-defective product rate for all the products produced by the order-receiving company, and is an example of a production management index that comprehensively represents the production efficiency of the products in the order-receiving company.

As is seen from the definition of the production management index described above, the higher the value of each production management index, the more efficiently the order-receiving company is producing the product. Note that the production management index shown in FIG. 3 is an example, and any item that represents the production efficiency of the product in the order-receiving company is included in the production management index according to the present exemplary embodiment even in a case where the item is an item other than the items shown in FIG. 3 or an indirect item that affects the production efficiency of the products, such as items that represent the ease of work of employees, such as the employee's paid leave utilization rate and average years of employment.

The order-receiving and ordering apparatus 2 receives such equipment information, process information, and production management index as production information from each order-receiving company, and stores the production information for each order-receiving company in chronological order. An acquisition interval of the production information from each order-receiving company may be set by the order-receiving and ordering apparatus 2, and in a case where the order-receiving terminal 5 of each order-receiving company receives a request for acquisition of production information from the order-receiving and ordering apparatus 2, the order-receiving terminal 5 transmits the latest production information to the order-receiving and ordering apparatus 2. As a matter of course, even in a case where there is no request for acquisition of production information from the order-receiving and ordering apparatus 2, the order-receiving terminal 5 of each order-receiving company may spontaneously transmit the production information to the order-receiving and ordering apparatus 2 in a case where a predetermined event such as the activation of the order-receiving terminal 5 occurs, for example.

On the other hand, the advertisement management apparatus 3 acquires the production information of each order-receiving company stored in the order-receiving and ordering apparatus 2, and uses the acquired production information to select an order-receiving company that produces products more efficiently than other order-receiving companies from among the order-receiving companies registered in advance, and is an example of an information processing apparatus that distributes the advertisement of the selected order-receiving company to the ordering company in preference to the other order-receiving companies. The advertisement distributed by the advertisement management apparatus 3 is displayed on the ordering screen 21 in which the person in charge of ordering of the ordering company inputs the ordering information in order to place an order for the product.

Figure 4:
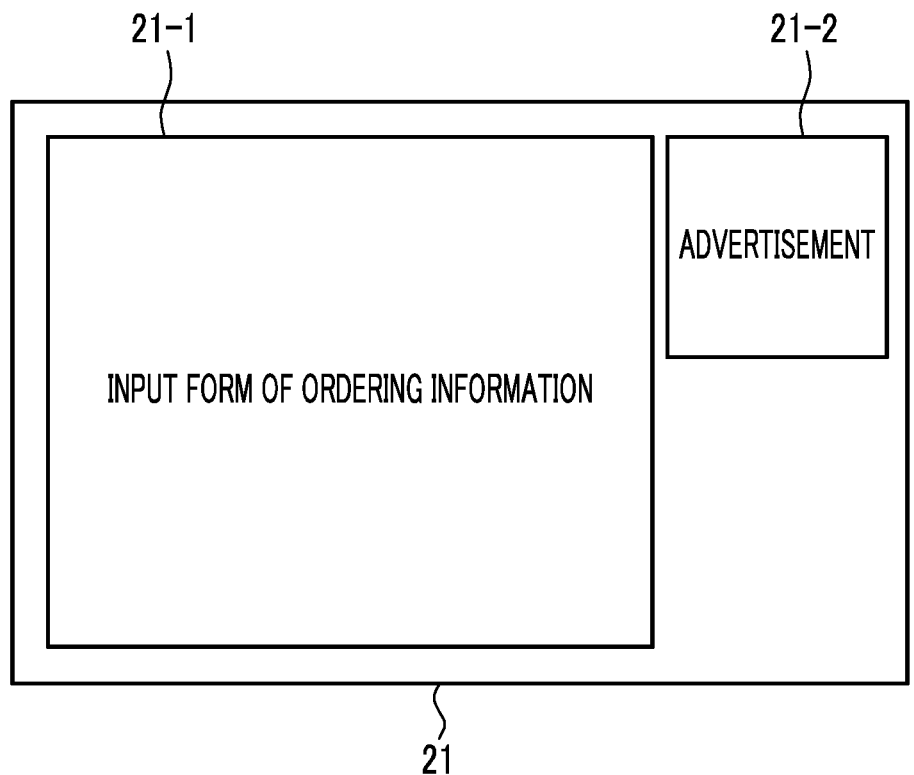
FIG. 4 is a diagram showing an example of an ordering screen.

FIG. 4 is a diagram showing an example of the ordering screen 21 displayed on the ordering terminal 4. As shown in FIG. 4, an input form for the person in charge of ordering to input the ordering information of the product is displayed in a main area 21-1 of the ordering screen 21. The advertisement distributed by the advertisement management apparatus 3 is displayed in, for example, an advertisement area 21-2 provided next to the main area 21-1, but there is no restriction on the position of the advertisement area 21-1 on the ordering screen 21.

Registration of the advertisement displayed in the advertisement area 21-2 to the advertisement management apparatus 3 is performed, for example, by a person in charge of advertising involved in the advertisement business in the order-receiving company.

Figure 5:
FIG. 5 is a diagram showing an example of an advertisement registration screen.

FIG. 5 is a diagram showing an example of an advertisement registration screen 6 displayed on the order-receiving terminal 5 by the advertisement management apparatus 3 in response to a request from a person in charge of advertising.

The registration screen 6 includes each setting item of, for example, a distribution target (company), a distribution target (user), a distribution period, a maximum number of distributions, an advertisement content, an advertising tag, a landing page uniform resource locator (URL), an advertisement type, and an advertisement image URL.

The distribution target (company) is a setting item for setting an attribute of the ordering company to which the advertisement is desired to be distributed, and for example, a type of business or a size of the company is set.

The distribution target (user) is a setting item for setting an attribute of the employee in the ordering company to which the advertisement is desired to be distributed, and for example, a department in which the employee is in charge or a job title of the employee is selected.

The distribution period is a setting item for setting the period, such as from when to when the advertisement is distributed.

The maximum number of distributions is a setting item for setting an upper limit of the number of distributions of an advertisement in a set distribution period.

The advertisement content is a setting item for setting what kind of content the advertisement to be distributed is.

The advertising tag is a setting item for setting a correspondence relationship between the advertisement and the equipment that produces the product advertised in the advertisement in the order-receiving company for which the advertisement is distributed (referred to as "distribution source order-receiving company"). For example, "gold/silver/metallic" advertising tag is set in advance for equipment capable of gold, silver, and metallic printing, and in a case where the "gold/silver/metallic" advertising tag is set for the advertisement on the registration screen 6, the advertisement is associated with equipment capable of gold, silver, and metallic printing. That is, the features and functions of the equipment used to produce the product advertised in the advertisement are set as the setting values of the advertising tag.

The landing page URL is a setting item for setting a link destination of the advertisement screen displayed on the ordering terminal 4 in a case where the advertisement area 21-2 of the ordering screen 21 is selected.

The advertisement type is a setting item for setting a display form of the advertisement, such as a display position of the advertisement, a display effect, and a size of the advertisement area 21-2 on the ordering screen 21.

The advertisement image URL is a setting item for setting a link destination of the advertisement screen displayed in the advertisement area 21-2 of the ordering screen 21.

The person in charge of advertising of each order-receiving company sets each setting item displayed on the registration screen 6 for each advertisement and registers the advertisement in the advertisement management apparatus 3. The information registered in the advertisement management apparatus 3 by using the registration screen 6 is referred to as advertisement information.

Note that the distribution target (company) and the distribution target (user) on the registration screen 6 indicate the attribute of the distribution destination to which the person in charge of advertising particularly wants to distribute the advertisement, and are examples of the attribute related to the distribution target to which the advertisement is desired to be distributed, that is, a distribution attribute.

As will be described later, in a case where the distribution source order-receiving company of the selected advertisement has registered a plurality of advertisements, the advertisement management apparatus 3 selects an advertisement to be distributed from among the plurality of advertisements based on a degree of matching between the distribution attribute of the advertisement set on the registration screen 6 and the attribute related to the ordering source of the product which is the distribution destination of the advertisement. Note that the attribute related to the ordering source of the product includes an attribute related to an individual that is a person in charge of ordering as represented by the distribution target (user) of the registration screen 6, as well as an attribute related to a company to which the person in charge of ordering belongs as represented by the distribution target (company) of the registration screen 6. Hereinafter, the attribute related to the ordering source of the product is referred to as "ordering source attribute".

In a case where the advertising tag is set in the registered advertisement, the advertisement management apparatus 3 adjusts the degree of matching between the ordering source attribute and the distribution attribute according to the operation status of the equipment in which the same advertising tag as the advertising tag set in the advertisement is set, that is, the equipment associated with the advertising tag.

Figure 6:
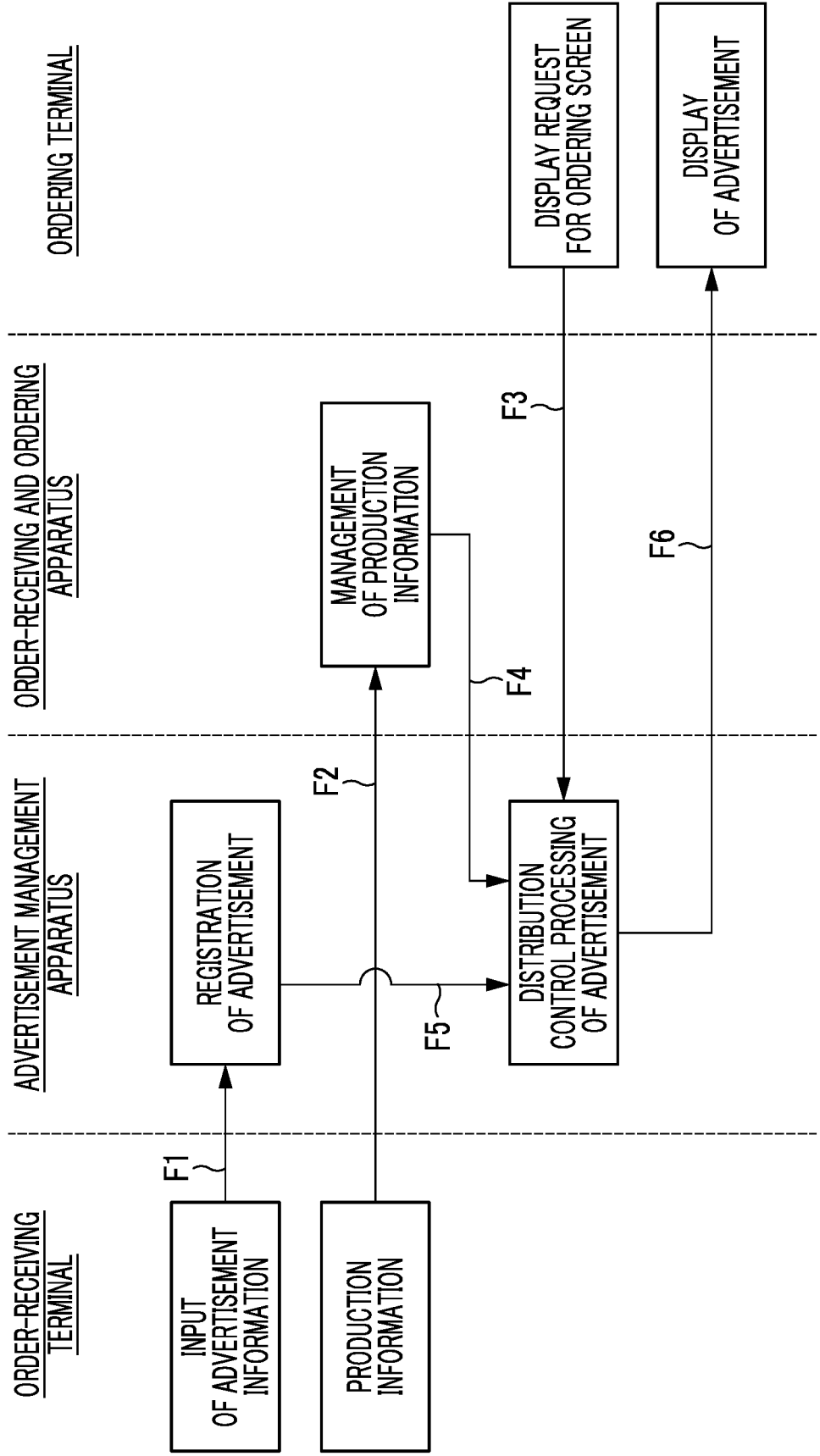
FIG. 6 is a sequence diagram showing an example of a processing flow in an order-receiving and ordering system.

FIG. 6 is a sequence diagram showing an example of the processing flow in the order-receiving and ordering system 1 described so far.

The advertisement information is set by the person in charge of advertising from the advertisement registration screen 6 displayed on the order-receiving terminal 5, and the advertisement is registered in the advertisement management apparatus 3 (refer to sequence F1).

Further, the production information is transmitted from the order-receiving terminal 5 of each order-receiving company at a timing of at least one of predetermined intervals or random timing, and the production information is managed by the order-receiving and ordering apparatus 2 for each order-receiving company (refer to sequence F2).

On the other hand, in a case where the ordering terminal 4 requests the display of the ordering screen 21 (refer to sequence F3), the advertisement management apparatus 3 acquires the production information of each order-receiving company from the order-receiving and ordering apparatus 2 (refer to sequence F4) and also acquires the registered advertisement information for each advertisement (refer to sequence F5).

Then, the advertisement management apparatus 3 uses the acquired production information and advertisement information to select an advertisement appropriate for the ordering company that has made the display request of the ordering screen 21 from among a plurality of advertisements of each order-receiving company registered in advance, and performs advertisement distribution control processing of transmitting the ordering screen 21 including the selected advertisement to the ordering terminal 4 that has made the display request of the ordering screen 21 (refer to sequence F6). As a result, the advertisement selected by the advertisement management apparatus 3 is displayed in the ordering screen 21 displayed on the ordering terminal 4.

The advertisement management apparatus 3 in the order-receiving and ordering system 1 that performs such processing is configured by using a computer 10.

Figure 7:
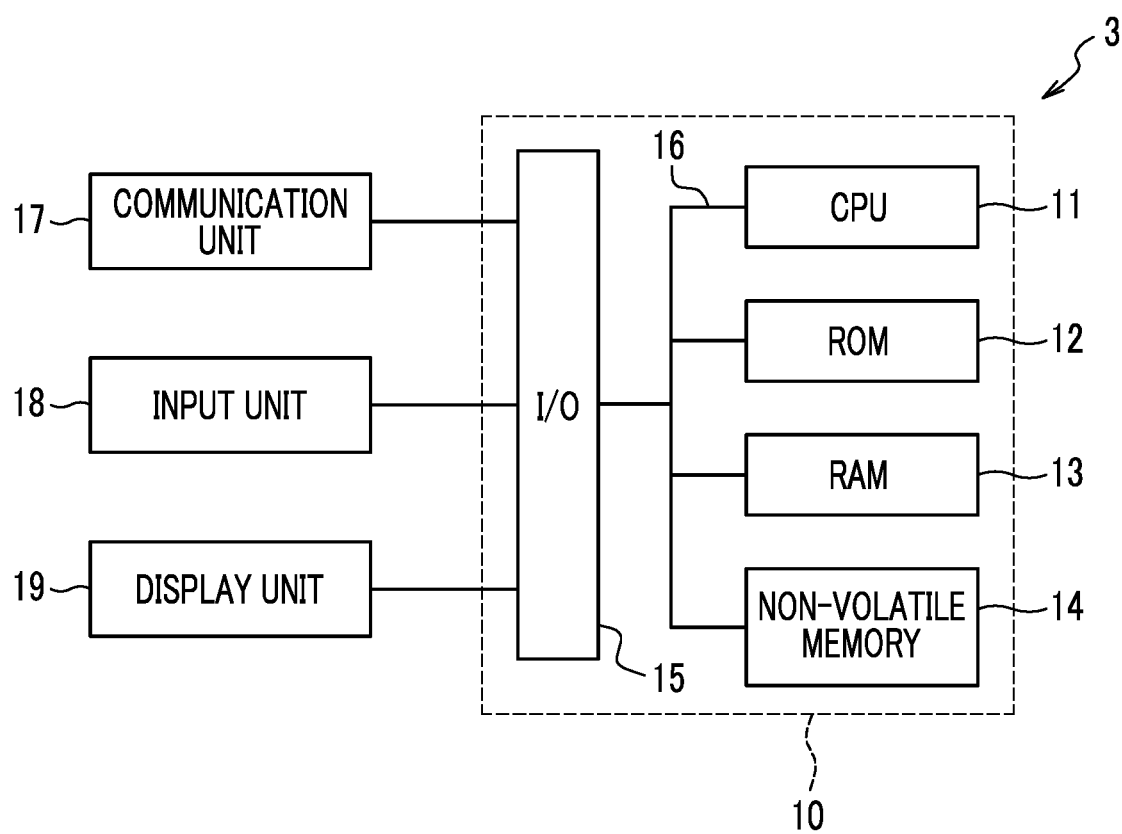
FIG. 7 is a diagram showing an example of a main part configuration of an electric system in an advertisement management apparatus.

FIG. 7 is a diagram showing an example of a main part configuration of an electric system in the advertisement management apparatus 3 using the computer 10.

The computer 10 includes a central processing unit (CPU) 11 which is an example of a processor that executes a function of the advertisement management apparatus 3, a read only memory (ROM) 12 which stores an information processing program that causes the computer 10 to function as the advertisement management apparatus 3, a random access memory (RAM) 13 which is used as a temporary work area of the CPU 11, a non-volatile memory 14, and an input/output interface (I/O) 15. The CPU 11, ROM 12, RAM 13, non-volatile memory 14, and I/O 15 are connected to each other via a bus 16.

The non-volatile memory 14 is an example of a storage apparatus in which the stored information is maintained even in a case where the power supplied to the non-volatile memory 14 is cut off, and as the non-volatile memory 14, for example, a semiconductor memory is used, but a hard disk may be used. In the non-volatile memory 14, for example, a parameter such as a threshold value and advertisement information referred to in a case where the CPU 11 executes the information processing program is stored.

Further, for example, a communication unit 17, an input unit 18, and a display unit 19 are connected to the I/O 15.

The communication unit 17 is connected to the communication line 7 and the internal LAN 8, and includes a communication protocol for performing data communication with the order-receiving and ordering apparatus 2, each ordering terminal 4, each order-receiving terminal 5, and other external apparatuses (not shown) connected to the communication line 7.

The input unit 18 is an apparatus that receives an instruction from an operator of the advertisement management apparatus 3 and notifies the CPU 11 of the instruction, and for example, a button, a touch panel, a keyboard, a pointing device, a mouse, and the like may be used as the input unit 18.

The display unit 19 is an apparatus that displays information processed by the CPU 11, and for example, a liquid crystal display, an organic electro luminescence (EL) display, and a display device such as a projector that projects a video onto a screen may be used as the display unit 19.

Note that the computer 10 may be configured by using cloud computing, and in this case, the computer 10 is remotely operated from an external apparatus via the communication line 7. Therefore, in the computer 10, the input unit 18 and the display unit 19 are not necessarily necessary units.

Figure 8:
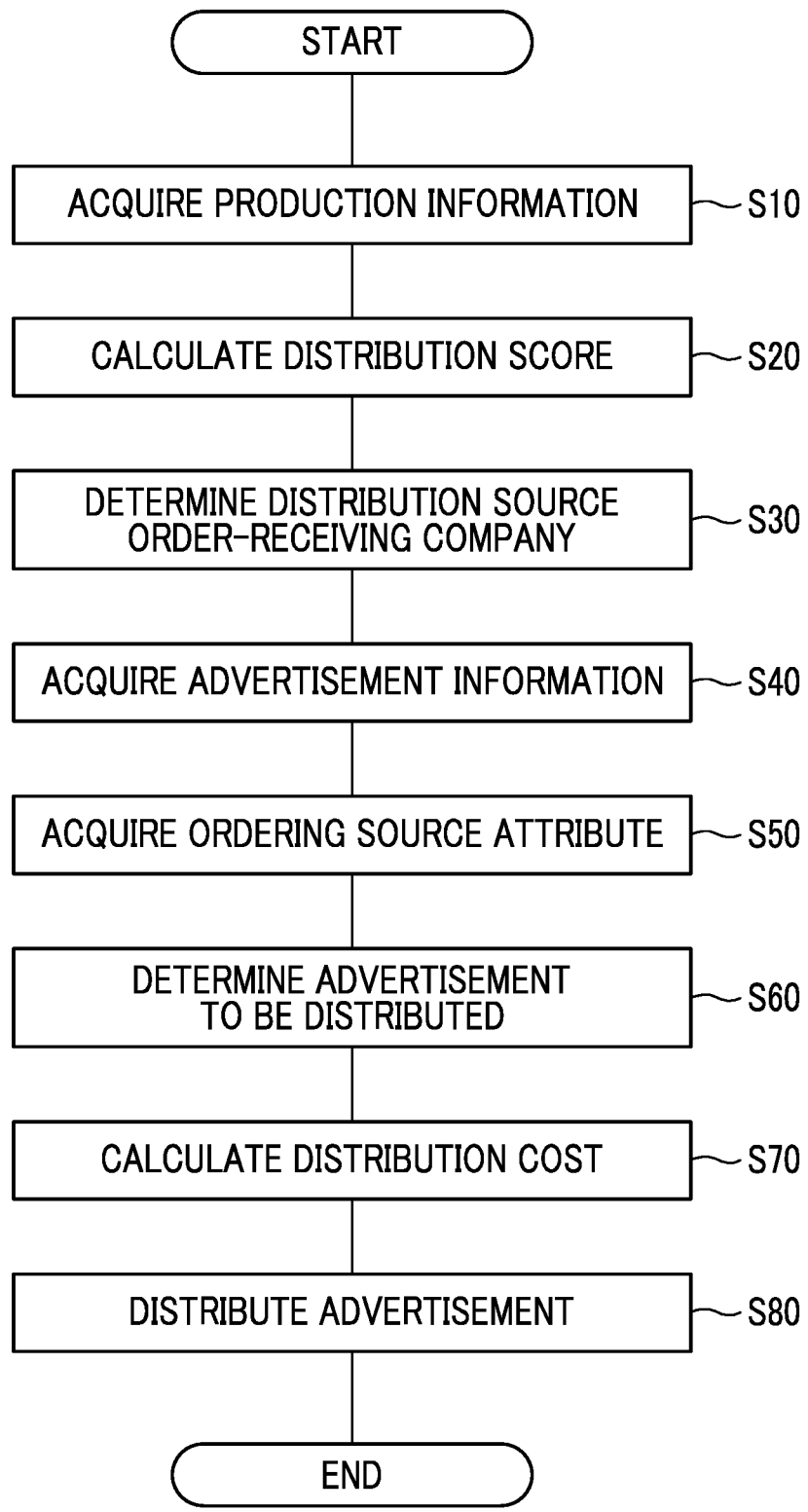
FIG. 8 is a flowchart showing an example of a flow of advertisement distribution control processing.

Next, the operation of the advertisement management apparatus 3 will be described in detail. FIG. 8 is a flowchart showing an example of a flow of advertisement distribution control processing executed by the CPU 11 of the advertisement management apparatus 3 in a case where, for example, a display request for the ordering screen 21 is received from the ordering terminal 4.

The information processing program that defines the advertisement distribution control processing is stored in advance in, for example, the ROM 12 of the advertisement management apparatus 3. The CPU 11 of the advertisement management apparatus 3 reads the information processing program stored in the ROM 12 and executes the advertisement distribution control processing.

Note that it is assumed that the non-volatile memory 14 of the advertisement management apparatus 3 stores in advance the advertisement information associated with the advertisement of each order-receiving company, and the order-receiving and ordering apparatus 2 manages the production information of each order-receiving company.

In step S10, the CPU 11 acquires the latest production information from the order-receiving and ordering apparatus 2 for each order-receiving company and stores the latest production information in the RAM 13.

In step S20, the CPU 11 calculates a distribution score y for each order-receiving company for which the production information has been acquired in step S10. The distribution score y is a score obtained from the production management index included in the production information, and is a score indicating a larger value as the production efficiency of the product indicated by the production management index increases. That is, the distribution score y is a score that quantifies the corporate efforts made by the order-receiving company so that the request from the ordering company related to the product may be satisfied.

The CPU 11 calculates the distribution score y by using, for example, Formula (1).

$$y = \sum_{i=1}^{n} w_i g_i(x) \quad (1)$$

Here, "i" is an index representing each item of the production management index, and "n" represents the number of items of the production management index. Further, "x" is a production management index vector having a value for each item of the production management index in the order-receiving company for which the distribution score y is calculated as an element, and $g_i(x)$ is a function for acquiring the value of the item of the production management index represented by the index i from the production management index vector x. Note that in a case where the value of the production management index is an item notified for each equipment, the CPU 11 may use an average value of the production management index for each equipment in the same item as an element of the production management index vector.

"$w_i$" is a weighting coefficient of a real number predetermined for each item of the production management index represented by the index i, and is stored in advance in the non-volatile memory 14. The weighting coefficient $w_i$ is stored in advance in, for example, the non-volatile memory 14, and may be changed.

For example, the function $g_1(x)$ is a function for acquiring the hourly operation rate, the function $g_2(x)$ is a function for acquiring the performance operation rate, and the function $g_i(x)$ acquires the value of the corresponding item of the production management index from the production management index vector x for each item of the production management index shown in FIG. 3.

As described above, the CPU 11 calculates the distribution score y for each order-receiving company by using the production management index weighted by the weighting coefficient $w_i$ for each item.

Since the size of the distribution score y represents the high production efficiency of the product in the order-receiving company, in step S30, from the distribution scores y for each of the order-receiving companies calculated in step S20, the CPU 11 determines an order-receiving company having the largest distribution score y as the distribution source order-receiving company for which the advertisement is distributed.

Therefore, the advertisement of the order-receiving company having a larger distribution score y has a higher advertisement distribution frequency in a predetermined period such as one week or one month than the advertisements of the other order-receiving companies.

Note that as shown in Formula (1), in a case where the distribution source order-receiving company is determined by using only the production management index of the order-receiving company, in a case where there is an order-receiving company of which product production efficiency is always higher than the product production efficiency of other order-receiving companies, only an advertisement of the order-receiving company will be distributed to the ordering company. Therefore, the CPU 11 may calculate the distribution score y for each order-receiving company by using Formula (2) in which an adjustment value b (b is a real number) of which a size is randomly set each time the distribution score y is calculated is added.

$$y = \sum_{i=1}^{n} w_i g_i(x) + b \quad (2)$$

By calculating the distribution score y by using Formula (2), even in a case where the order-receiving company has a second or lower product production efficiency, an advertisement may be distributed to the ordering company.

In a case where there is only one advertisement registered by the distribution source order-receiving company, the advertisement to be distributed is also uniquely determined by determining the distribution source order-receiving company, but there is a case where the distribution source order-receiving company has registered a plurality of advertisements. Therefore, the CPU 11 determines an advertisement to be distributed from the plurality of advertisements in the subsequent processing.

Therefore, in step S40, the CPU 11 acquires advertisement information of each advertisement registered by the distribution source order-receiving company from the nonvolatile memory 14.

In step S50, the CPU 11 acquires an ordering source attribute of the ordering company that has made the display request of the ordering screen 21. Specifically, the CPU 11 acquires the ordering source attribute from a database that stores information related to the ordering company such as capital and type of industry, or information input to the ordering terminal 4 in a case where the person in charge of ordering makes a display request for the ordering screen 21.

Since the distribution attribute of the advertisement information represents the distribution target to which the advertisement is desired to be distributed, in step S60, the CPU 11 extracts the distribution attribute from the advertisement information of each advertisement acquired in step S40 respectively, and calculates the degree of matching between the extracted distribution attribute and the ordering source attribute acquired in step S50 for each advertisement registered by the distribution source order-receiving company.

In a case where the distribution attribute is "u", the ordering source attribute is "v", and a similarity representing the degree of matching between the distribution attribute and the ordering source attribute is "z", the similarity z is represented by $z=f(u, v)$. The function $f(u, v)$ is a function for calculating the similarity between the distribution attribute and the ordering source attribute, and a known evaluation function for evaluating the similarity, such as pattern matching and a distance function may be used. The larger the value representing the similarity z, the higher the degree of matching between the distribution attribute and the ordering source attribute.

The CPU 11 determines the advertisement having the highest degree of similarity z between the distribution attribute and the ordering source attribute as an advertisement appropriate for the ordering company, that is, an advertisement to be distributed.

As described above, the CPU 11 may determine the advertisement to be distributed to the ordering company based on the similarity z between the distribution attribute and the ordering source attribute, but it is conceivable that, by advertising a product with an advertisement, the number of orders for the product in a future predetermined period (for example, one week) will increase from the current number of orders. Then, in a case where the future operation rate of the equipment that produces the product advertised in the advertisement is expected to be higher than the current operation rate, it is conceivable a case where a situation that the advertisement further increases the order of the product, and as a result, the order may not be processed and the delivery time of the product may be longer than the standard period occurs.

Therefore, the CPU 11 may adjust the similarity z according to the future operation status of the equipment that produces the product to be advertised in the advertisement.

For example, the CPU 11 acquires an advertising tag set in the advertisement through the advertisement information, and specifies the equipment in which the same advertising tag as in the advertisement is set from the equipment information included in the production information. Then, the CPU 11 estimates the future operation status of the equipment in which the same advertising tag as in the advertisement is set from the production management index representing the operation information of the equipment such as the hourly operation rate and the A efficiency of the specified equipment. Note that a known estimation method may be used to estimate the future operation status of the equipment.

In a case where it is estimated that the free time during which the product is not produced for the equipment will increase from the current level, in other words, in a case where it is estimated that more orders may be received for the product to be advertised in the advertisement, the CPU 11 adjusts the similarity z of the advertisement in which the same advertising tag as in the equipment is set so that the value is higher than the similarity z obtained in a case where the operation status of the equipment is not taken into consideration.

On the other hand, in a case where it is estimated that the free time during which the product is not produced for the equipment will decrease from the current level, in other words, in a case where it is estimated that the order for the product to be advertised in the advertisement will be received less than the current situation, the CPU 11 adjusts the similarity z of the advertisement in which the same advertising tag as in the equipment is set, so that the value is lower than the similarity z obtained in a case where the operation status of the equipment is not taken into consideration.

In step S70, the CPU 11 calculates the advertisement distribution cost collected from the order-receiving company in accordance with the distribution of the advertisement.

As the advertisement distribution cost, for example, a base amount per distribution is set in advance, but the CPU 11 may adjust the advertisement distribution cost according to the value of the distribution score y calculated in step S20.

FIG. 9 is a diagram showing an example of the cost adjustment table 9. In the cost adjustment table 9, an adjustment rate of the advertisement distribution cost is associated with each section of the distribution score y divided by the threshold value. In the example of the cost adjustment table 9 shown in FIG. 9, in a case where the distribution score y is equal to or more than 0 and less than 10, an adjustment rate of 20% is associated, and in a case where the distribution score y is equal to or more than 80 and less than 90, an adjustment rate of −10% is associated. A positive adjustment rate represents that the base amount of the advertisement distribution cost is increased by the value of the adjustment rate displayed in the cost adjustment table 9, and a negative adjustment rate represents that the base amount of the advertisement distribution cost is reduced by the value of the adjustment rate displayed in the cost adjustment table 9.

The CPU 11 refers to the cost adjustment table 9 and adjusts so that the advertisement distribution cost becomes lower than the base amount as the production efficiency of the product in the order-receiving company becomes higher than the production efficiency of the product corresponding to the base amount, and adjusts so that the advertisement distribution cost becomes higher than the base amount as the production efficiency of the product in the order-receiving company becomes lower than the production efficiency of the product corresponding to the base amount.

Note that needless to say, an adjustment amount may be set instead of the adjustment rate of the cost adjustment table 9, and a calculation formula for calculating the adjustment rate and the adjustment amount may be set by using the distribution score y. In a case where the adjustment amount is used instead of the adjustment rate, a positive adjustment amount is set for the section of the distribution score y that increases the advertisement distribution cost from the base amount, and a negative adjustment amount is set for the section of the distribution score y that reduces the advertisement distribution cost from the base amount. That is, based on the adjustment amount of the specific section of the distribution score y, the negative adjustment amount in which an absolute value increases as the distribution score y increases is set, and the positive adjustment amount in which the absolute value increases as the distribution score y decreases is set.

In step S80, the CPU 11 transmits the ordering screen 21 in which the advertisement determined in step S60 based on the similarity z is displayed in the advertisement area 21-2 to the ordering terminal 4 that has made the display request of the ordering screen 21, and distributes the advertisement to the ordering terminal 4.

As a result, the advertisement distribution control processing shown in FIG. 8 is completed.

In the advertisement distribution control processing shown in FIG. 8, after determining the distribution source order-receiving company by using the distribution score y, by using the distribution attribute of the advertisement and the similarity z of the ordering source attribute in the ordering company that has made the display request of the ordering screen 21, the advertisement to be distributed to the ordering company has been determined from a plurality of advertisements registered by the distribution source order-receiving company.

However, the advertisement to be distributed to the ordering company may be determined by adding the similarity z between the distribution attribute of the advertisement and the ordering source attribute of the ordering company to the calculation of the distribution score y from the beginning. For example, Formula (2) for calculating the distribution score y may be modified as Formula (3).

$$y = wz + \sum_{i=1}^{n} w_i g_i(x) + b \qquad (3)$$

In Formula (3), "w" is a weighting coefficient of a real number that weights the similarity z. The weighting coefficient w is stored in advance in, for example, the non-volatile memory 14, and may be changed. The CPU 11 may calculate the distribution score y for each registered advertisement by using Formula (3), and determine the advertisement having the largest distribution score y as the advertisement to be distributed to the ordering company.

Further, the CPU 11 may use the future operation status of the equipment that produces the product to be advertised in the advertisement for calculating the distribution score y. Formula (4) is an example of a formula for calculating the distribution score y, which takes into consideration the future operation status of the equipment that produces the product to be advertised in the advertisement.

$$y = wz + \sum_{i=1}^{n} w_i g_i(x) + w_0 h(r) + b \qquad (4)$$

"r" is an advertising tag vector having a value representing the setting status for each advertising tag that may be set on the registration screen 6 as an element. For example, as shown in FIG. 5, in a case where the advertising tag that may be set on the registration screen 6 is foil stamping, gold/silver/metallic, and label/package, the advertising tag vector r=(foil stamping, gold/silver/metallic, label/package).

The CPU 11 determines whether or not an advertising tag is set in the advertisement for each advertising tag by using the advertisement information, and in a case where the advertising tag is set in the advertisement, the CPU 11 sets "1" in the element of the advertising tag vector r at the position corresponding to the advertising tag set in the advertisement, and in a case where the advertising tag is not set in the advertisement, the CPU 11 sets the element of the advertising tag vector r at the position corresponding to the advertising tag which is not set in the advertisement to "0".

A score adjustment function h(r) is a score adjustment function that outputs the future operation status of the equipment in which the same advertising tag as the advertising tag set in the advertisement is set as the adjustment value of the distribution score y, from the setting status of each advertising tag represented by the advertising tag vector r. The larger the value of the score adjustment function h(r), the greater the future production capacity of the product to be advertised in the advertisement than the current situation.

That is, the score adjustment function h(r) is based on a specific production capacity (for example, the current production capacity), and outputs a positive adjustment value in which an absolute value increases as the estimated production capacity increases from a standard, and outputs a negative adjustment value in which absolute value increases as the estimated production capacity decreases from a standard.

FIG. 10 is a diagram showing an example of a score adjustment table 20 in which the operation rate of equipment, which is an example of an index representing the production capacity of the product expected in the future, and the adjustment value of the distribution score y (referred to as "adjustment score") are associated with each other. The CPU 11 outputs the adjustment score associated with the section including the future operation rate of the equipment that produces the product to be advertised in the advertisement, which is estimated in advance, as the score adjustment function h(r).

In the score adjustment table 20 shown in FIG. 10, since the basis of the operation rate is equal to or more than 40% and less than 60%, and the production capacity of the product increases as the operation rate becomes lower than 40%, a positive adjustment score in which an absolute value increases as the operation rate decreases is set. Further, since the production capacity of the product decreases as the operation rate becomes higher than 60%, a negative adjustment score in which an absolute value increases as the operation rate increases is set. Note that in a case where there are a plurality of pieces of equipment that produces the product to be advertised in the advertisement, the CPU 11 may acquire the adjustment score from the score adjustment table 20 by using the average value of the future operation rate of each equipment.

Note that in Formula (4), "$w_0$" is a weighting coefficient of a real number that weights the score adjustment function $h(r)$. The weighting coefficient $w_0$ is stored in advance in, for example, the non-volatile memory 14, and may be changed.

The CPU 11 may calculate the distribution score y from Formula (3) or Formula (4) for each registered advertisement, and determine the advertisement having the largest distribution score y as the advertisement to be distributed to the ordering company.

Note that in the advertisement distribution control processing shown in FIG. 8, the advertisement distribution frequency is increased as the advertisement of the order-receiving company has a larger distribution score y, and the CPU 11 may adjust the size of the advertisement to be displayed so that the advertisement of the order-receiving company with a larger distribution score y is displayed in the advertisement area 21-2 to be larger than the size of the advertisement designated by the advertisement type included in the advertisement information of the advertisement.

Figure 11A:
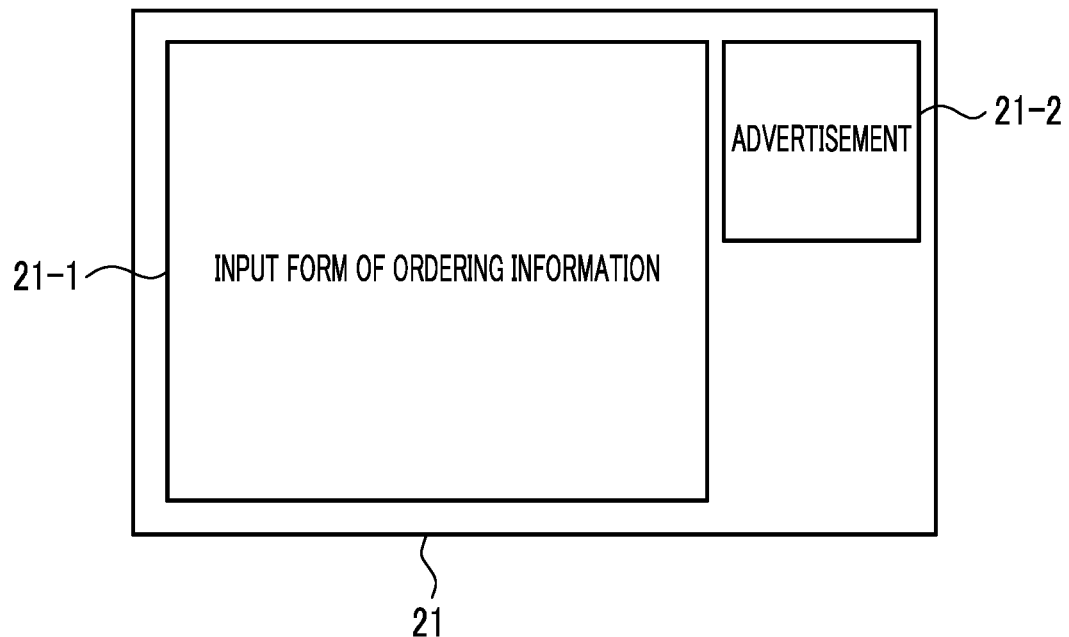
FIGS. 11A and 11B are diagrams showing an example of an ordering screen in which a size of an advertisement is adjusted.
Figure 11B:
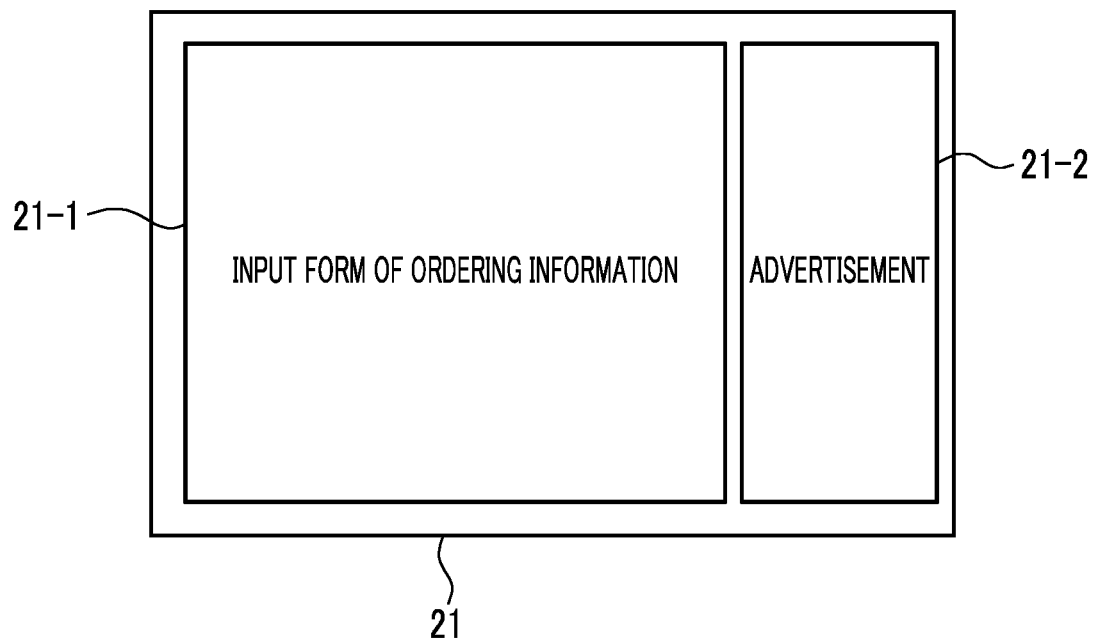

FIGS. 11A and 11B are a diagram showing an example of an ordering screen 21 in which the size of the displayed advertisement has been adjusted. FIG. 11A is a diagram showing the size of the advertisement area 21-2 in a case where the distribution score y is included in a predetermined reference score range. On the other hand, FIG. 11B is a diagram showing the size of the advertisement area 21-2 in a case where the distribution score y is included in the score range larger than the predetermined reference score range.

As described above, the CPU 11 may make the size of the advertisement area 21-2 for displaying the advertisement larger than the size designated by the advertisement type included in the advertisement information as the distribution score y increases, together with controlling the distribution frequency of the advertisement by the distribution score y or instead of controlling the distribution frequency by the distribution score y.

Note that since the size of the advertisement area 21-2 designated by the advertisement type is a contract item with the order-receiving company, for example, it is better not to make adjustments that are disadvantageous to the order-receiving company. Therefore, even in a case where the distribution score y is included in the score range lower than the predetermined reference score range, the CPU 11 does not make the size of the advertisement area 21-2 for displaying the advertisement smaller than the size designated by the advertisement type, and keeps the size designated by the advertisement type.

In the present exemplary embodiment, an example of distributing an advertisement for a product produced by an order-receiving company in the order-receiving and ordering system 1 has been described, but the order-receiving and ordering system 1 may also be used in a case where any ordering company distributes an advertisement for the product of the company or company to the order-receiving company participating in the order-receiving and ordering system 1. In this case, the order-receiving and ordering apparatus 2 receives the production information from the ordering company, and the advertisement management apparatus 3 displays the advertisement registration screen 6 on the ordering terminal 4 and displays the advertisement of the ordering company on the order-receiving terminal 5.

In a case where the ordering company does not produce the product, the production information received from the ordering company includes, for example, only the production management index. For the production management index of the ordering company that does not produce the product, instead of the index value related to the production efficiency of the product, for example, an index value related to employee sales efficiency, such as the number of products sold per employee per month, may be used.

The advertisement management apparatus 3 controls the advertisement distribution so that the advertisement of the ordering company with higher product sales efficiency has a higher degree of contact that the order-receiving company contacts the advertisement.

For example, in a case where the order-receiving company is looking for a sales agent that preferentially handles the company's products in order to expand the sales channel of the company's products, in a case where the ordering company distributes the advertisement, the ordering company has the merit that the order-receiving company contracts as the sales agent of the product with reference to the distributed advertisement.

Although one aspect of the order-receiving and ordering system 1 has been described above by using the exemplary embodiment, the disclosed mode of the order-receiving and ordering system 1 is an example, and the mode of the order-receiving and ordering system 1 is not limited to the scope described in the exemplary embodiment. Various changes or improvements may be made to the exemplary embodiment without departing from the gist of the present disclosure, and the changed or improved modes are also included in the technical scope of the present invention.

Further, in the above-described exemplary embodiment, a mode in which the advertisement distribution control processing is realized by software has been described. However, the same processing as in the flowchart of FIG. 8 may be processed by hardware. In this case, the processing speed may be increased as compared with a case where the advertisement distribution control processing is realized by software.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In the above exemplary embodiment, an example in which the information processing program is stored in the ROM 12 has been described, but the storage destination of the information processing program is not limited to the ROM 12. The information processing program of the exemplary embodiment of the present disclosure may also be provided in a mode of being recorded on a storage medium readable by the computer 10. For example, the information processing program may be provided in a mode of being recorded on an optical disk such as a compact disk read only memory (CD-ROM) and a digital versatile disk read only memory (DVD-ROM). Further, the information processing program may be provided in a mode of being recorded in a semiconductor memory such as a universal serial bus (USB) memory and a memory card. The ROM 12, non-volatile memory 14, CD-ROM, DVD-ROM, USB, and memory card are examples of non-transitory storage media.

Further, the advertisement management apparatus 3 may download the information processing program from an external apparatus connected to the communication line 7 and store the downloaded information processing program in the storage apparatus. In this case, the CPU 11 of the advertisement management apparatus 3 reads the information processing program downloaded from the external apparatus and executes the advertisement distribution control processing.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
store information for advertisements and production efficiencies of a product corresponding to each of a plurality of order receiving companies to a database, the production efficiencies being updated periodically;
in response to receiving an access from an ordering terminal used by an orderer of the product, output an ordering screen including a main area and advertisement area to the ordering terminal, the main area displaying a form to receive information for an order of the product and the advertisement area displaying an advertisement selected from the advertisements stored in the database;
obtain the production efficiencies from the database in response to receiving the access from the ordering terminal;
based on the obtained production efficiencies, calculate distribution scores for each of the plurality of order-receiving companies according to the at least one index value related to the production efficiency of the products and an adjustment value of which a size is randomly set, wherein the at least one index value represents the production efficiency of the product, and the distribution score is larger as the at least one index value is larger;
select an advertisement corresponding an order-receiving company with higher distribution score than other order-receiving companies and output the selected advertisement to the advertisement area included in the ordering screen;
from each of a plurality of order-receiving companies that make-to-order the product ordered by the orderer, receive at least one index value related to the production efficiency of the product;
based on the distribution score of the selected advertisement, adjust a frequency of the selected advertisement or a size of the advertisement area displaying the selected advertisement; and
adjust a size of the advertisement and control a distribution frequency of the advertisement of the order-receiving company to be displayed on the ordering screen of the ordering terminal according to the distribution score of the order-receiving company, wherein the size of the advertisement of the order-receiving company is larger as the distribution score of the order-receiving company is larger, and the advertisement distribution frequency of the advertisement of the order-receiving company is higher as the distribution score of the order-receiving company is larger;
control advertisement distribution to an ordering terminal used by the orderer of the product for an order of the product, so that an advertisement of an order-receiving company having a larger distribution score, that is obtained from the index value for each order-receiving company and indicates a larger value as the production efficiency of the product increases, has a higher degree of contact that the orderer of the product contacts the advertisement,
wherein the production efficiency of the product represents at least one of a hourly operation rate, a performance operation rate, a C efficiency, a load factor, improvement rate, a delivery time achievement rate, a number of non-defective products, or an overall equipment effectiveness.

2. The information processing apparatus according to claim 1,
wherein the advertisement is associated with a distribution attribute that represents an attribute related to a distribution target to which the advertisement is to be distributed, and
the processor is configured to:
perform control to distribute an advertisement having a highest degree of matching between an ordering source attribute representing an attribute related to an ordering source of the product and the distribution attribute, to the ordering terminal from among a plurality of advertisements registered in advance by an order-receiving company having the largest distribution score.

3. The information processing apparatus according to claim 2,
wherein in a case where an advertising tag representing a correspondence relationship between the advertisement and equipment that produces the product in the order-receiving company of the product is set in the advertisement,
the processor is configured to:
adjust the degree of matching between the ordering source attribute and the distribution attribute according to an operation status of the equipment associated with the advertising tag.

4. The information processing apparatus according to claim 3 wherein the processor is configured to:
estimate a future operation status of the equipment associated with the advertising tag from an operation status of the equipment associated with the advertising tag in a predetermined period,
in a case where it is estimated that an order for the product is less likely to be received than a current situation, adjust the degree of matching between the ordering source attribute and the distribution attribute to be lower than a degree of matching in a case where the future operation status of the equipment is not taken into consideration, and
in a case where it is estimated that an order for the product is likely to be received than a current situation, adjust the degree of matching between the ordering source attribute and the distribution attribute to be higher than the degree of matching in a case where the future operation status of the equipment is not taken into consideration.

5. The information processing apparatus according to claim 1 wherein the processor is configured to:
adjust advertisement distribution cost so that the larger the distribution score, the lower the advertisement distribution cost collected from the order-receiving company of the product than a base amount.

6. The information processing apparatus according to claim 2 wherein the processor is configured to:
adjust advertisement distribution cost so that the larger the distribution score, the lower the advertisement distribution cost collected from the order-receiving company of the product than a base amount.

7. The information processing apparatus according to claim 3 wherein the processor is configured to:
adjust advertisement distribution cost so that the larger the distribution score, the lower the advertisement distribution cost collected from the order-receiving company of the product than a base amount.

8. The information processing apparatus according to claim 4 wherein the processor is configured to:
adjust advertisement distribution cost so that the larger the distribution score, the lower the advertisement distribution cost collected from the order-receiving company of the product than a base amount.

9. The information processing apparatus according to claim 5 wherein the processor is configured to:
adjust the distribution cost of the advertisement distributed to the ordering terminal by using an adjustment rate or an adjustment amount with respect to the base amount set in advance for each section divided by a threshold value.

10. The information processing apparatus according to claim 1 wherein the processor is configured to:
control the advertisement distribution to the ordering terminal so that the advertisement of the order-receiving company having a larger distribution score has a higher advertisement distribution frequency in a predetermined period.

11. The information processing apparatus according to claim 1 wherein the processor is configured to:
control the advertisement distribution to the ordering terminal so that the advertisement of the order-receiving company having a larger distribution score is displayed on a screen of the ordering terminal larger than a size designated in advance.

12. A non-transitory computer readable medium storing an information processing program causing a computer to execute a process comprising:
storing information for advertisements and production efficiencies of a product corresponding to each of a plurality of order receiving companies to a database, the production efficiencies being updated periodically;
in response to receiving an access from an ordering terminal used by an orderer of the product, outputting an ordering screen including a main area and advertisement area to the ordering terminal, the main area displaying a form to receive information for an order of the product and the advertisement area displaying an advertisement selected from the advertisements stored in the database;
obtaining the production efficiencies from the database in response to receiving the access from the ordering terminal;
from each of a plurality of order-receiving companies that make-to-order the product ordered by the orderer, receiving at least one index value related to the production efficiency of the product;
based on the obtained production efficiencies, calculating distribution scores for each of the plurality of order-receiving companies according to the at least one index value related to the production efficiency of the products and an adjustment value of which a size is randomly set, wherein the at least one index value represents the production efficiency of the product, and the distribution score is larger as the at least one index value is larger;
selecting an advertisement corresponding an order-receiving company with higher distribution score than other order-receiving companies and output the selected advertisement to the advertisement area included in the ordering screen;
based on the distribution score of the selected advertisement, adjusting a frequency of the selected advertisement or a size of the advertisement area displaying the selected advertisement; and
adjusting a size of the advertisement and control a distribution frequency of the advertisement of the order-receiving company to be displayed on the ordering screen of the ordering terminal according to the distribution score of the order-receiving company, wherein the size of the advertisement of the order-receiving company is larger as the distribution score of the order-receiving company is larger, and the advertisement distribution frequency of the advertisement of the order-receiving company is higher as the distribution score of the order-receiving company is larger;
controlling advertisement distribution to an ordering terminal used by the orderer of the product for an order of the product, so that an advertisement of an order-receiving company having a larger distribution score, that is obtained from the index value for each order-receiving company and indicates a larger value as the production efficiency of the product increases, has a higher degree of contact that the orderer of the product contacts the advertisement,
wherein the production efficiency of the product represents at least one of a hourly operation rate, a performance operation rate, a C efficiency, a load factor, improvement rate, a delivery time achievement rate, a number of non-defective products, or an overall equipment effectiveness.

13. An information processing method comprising:
storing information for advertisements and production efficiencies of a product corresponding to each of a plurality of order receiving companies to a database, the production efficiencies being updated periodically;
in response to receiving an access from an ordering terminal used by an orderer of the product, outputting an ordering screen including a main area and advertisement area to the ordering terminal, the main area displaying a form to receive information for an order of the product and the advertisement area displaying an advertisement selected from the advertisements stored in the database;
obtaining the production efficiencies from the database in response to receiving the access from the ordering terminal;
based on the obtained production efficiencies, calculating distribution scores for each of the plurality of order-receiving companies according to the at least one index value related to the production efficiency of the products and an adjustment value of which a size is randomly set, wherein the at least one index value represents the production efficiency of the product, and the distribution score is larger as the at least one index value is larger;

selecting an advertisement corresponding an order-receiving company with higher distribution score than other order-receiving companies and output the selected advertisement to the advertisement area included in the ordering screen;

from each of a plurality of order-receiving companies that make-to-order the product ordered by the orderer, receiving at least one index value related to the production efficiency of the product;

based on the distribution score of the selected advertisement, adjusting a frequency of the selected advertisement or a size of the advertisement area displaying the selected advertisement; and adjusting a size of the advertisement and control a distribution frequency of the advertisement of the order-receiving company to be displayed on the ordering screen of the ordering terminal according to the distribution score of the order-receiving company, wherein the size of the advertisement of the order-receiving company is larger as the distribution score of the order-receiving company is larger, and the advertisement distribution frequency of the advertisement of the order-receiving company is higher as the distribution score of the order-receiving company is larger;

controlling advertisement distribution to an ordering terminal used by the orderer of the product for an order of the product, so that an advertisement of an order-receiving company having a larger distribution score, that is obtained from the index value for each order-receiving company and indicates a larger value as the production efficiency of the product increases, has a higher degree of contact that the orderer of the product contacts the advertisement, wherein the production efficiency of the product represents at least one of a hourly operation rate, a performance operation rate, a C efficiency, a load factor, improvement rate, a delivery time achievement rate, a number of non-defective products, or an overall equipment effectiveness.

* * * * *